US005335862A

United States Patent [19]

Esper

[11] Patent Number: 5,335,862

[45] Date of Patent: Aug. 9, 1994

[54] DISCHARGE NOZZLE FOR A LIQUID FILLING ASSEMBLY

[75] Inventor: Leo J. Esper, Troy, Mich.

[73] Assignee: Elopak Systems A.G., Glattbrugg, Switzerland

[21] Appl. No.: 971,570

[22] Filed: Nov. 5, 1992

[51] Int. Cl.⁵ .......................... F16K 15/14; B05B 1/30

[52] U.S. Cl. .................................. 239/570; 141/115; 141/255; 251/902; 222/544

[58] Field of Search ................ 251/902; 141/255, 258, 141/115; 239/570; 222/255, 309, 544

[56] References Cited

U.S. PATENT DOCUMENTS

| | | | |
|---|---|---|---|
| 960,080 | 5/1910 | Fay et al. | 251/902 |
| 1,106,633 | 8/1914 | Denehie | 251/902 |
| 1,167,386 | 1/1916 | Crusius | 251/902 |
| 1,395,932 | 11/1921 | Staude | 251/902 |
| 2,125,435 | 8/1938 | Erling | 251/902 |
| 2,643,104 | 6/1953 | Holden | 261/76 |
| 3,415,294 | 12/1968 | Kelly | 141/1 |
| 3,630,444 | 12/1971 | Nelson | 239/29 |
| 3,703,913 | 11/1972 | Carsten | 251/902 |
| 3,730,439 | 5/1973 | Parkison | 239/590.3 |
| 3,868,991 | 3/1975 | Sheppard | 251/902 |
| 4,119,276 | 10/1978 | Nelson | 239/590.3 |
| 4,730,786 | 3/1988 | Nelson | 239/590.3 |
| 4,798,337 | 1/1989 | Shimokawa | 239/570 |
| 4,925,069 | 5/1990 | Veda et al. | 141/115 |
| 4,958,669 | 9/1990 | Ohta | 141/311 |
| 4,995,431 | 2/1991 | Wakabayshi et al. | 239/570 |

FOREIGN PATENT DOCUMENTS

| | | | |
|---|---|---|---|
| 528623 | 7/1931 | Fed. Rep. of Germany | 251/902 |
| 91978 | 6/1983 | Japan | 251/902 |
| 1302069 | 4/1987 | U.S.S.R. | 251/902 |

*Primary Examiner*—Andres Kashnikow
*Assistant Examiner*—Christopher G. Trainor
*Attorney, Agent, or Firm*—Reising, Ethington, Barnard, Perry & Milton

[57] ABSTRACT

A liquid filling assembly includes a discharge nozzle arrangement which includes a closely wound spring operatively connected at its outer periphery to a diffuser chamber and including a plurality of coils adapted to retain a volume of fluid thereabove until the fluid is forced under pressure against the spring or an associated valve to urge the coils apart to provide clearances therebetween for the flow therethrough of the fluid.

24 Claims, 4 Drawing Sheets

FIG. 5
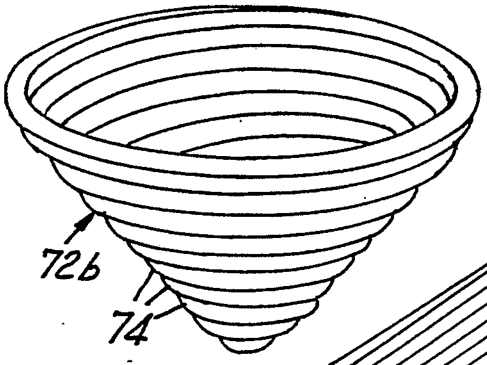
FIG. 6
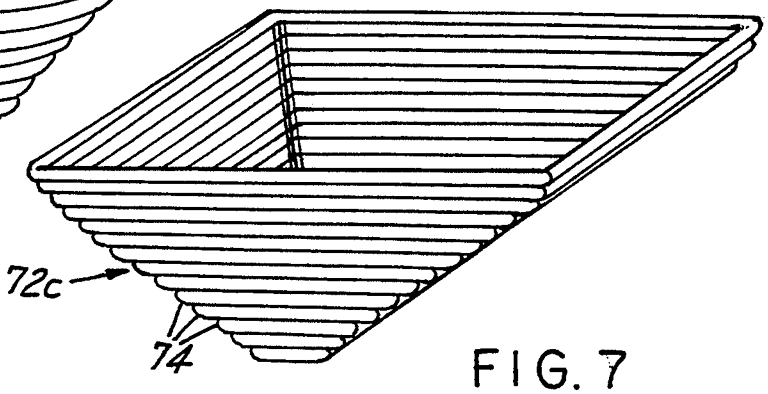
FIG. 7
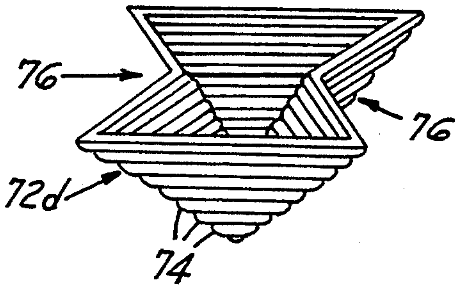
FIG. 13
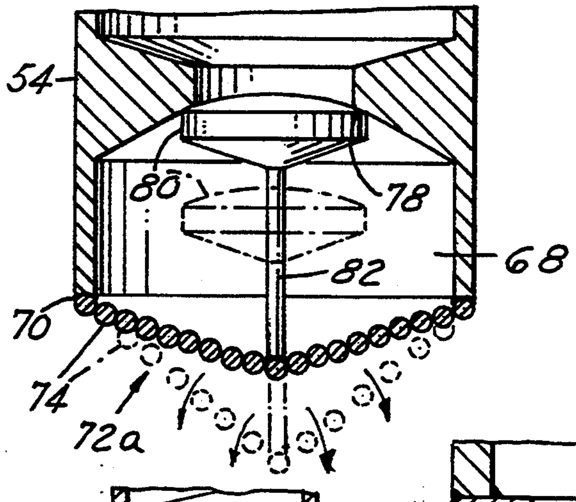
FIG. 12A
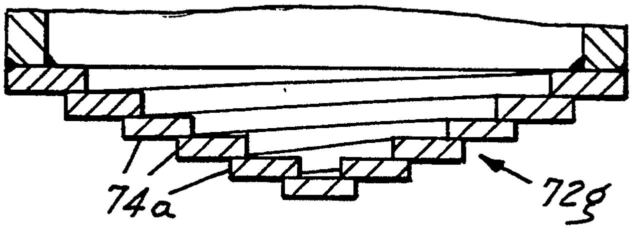
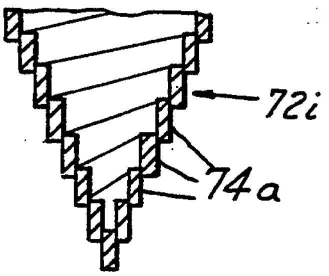
FIG. 12C
FIG. 12B
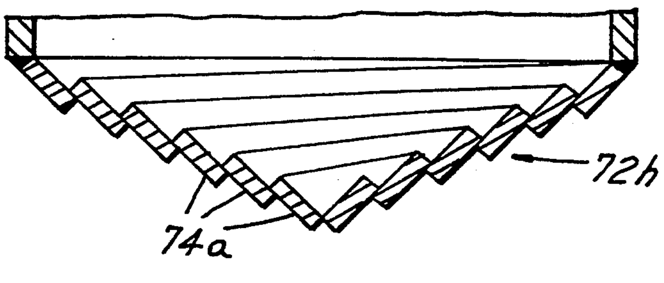

DISCHARGE NOZZLE FOR A LIQUID FILLING ASSEMBLY

Technical Field

This invention relates generally to filler nozzles for filling liquid-carrying containers and, more particularly, to tension coil springs mounted in the nozzle discharge end for preventing the liquid from flowing out of the nozzle body.

BACKGROUND ART

Devices for preventing liquid from flowing out of nozzle bodies under gravity has been addressed heretofore. For example, Ohta Pat. No. 4,958,669 discloses various spaced apart, perforated plate designs for use within the discharge end of the nozzle body for the purpose described above. The suggested plates have a particular thickness and any of square, circular, triangular, or hexagonal openings formed therein, with a specified opening ratio of the total volume of the openings to the total volume, inclusive of the openings, of the plate.

Nelson Pat. No. 4,119,276 discloses a laminar stream faucet spout attachment including spaced apart perforated plates and screens.

Kelly Pat. No. 3,415,294 discloses a plurality of relatively closely spaced fine mesh screens, separated by 0-rings, at the discharge opening of a liquid filling machine for eliminating or minimizing the formation of foam as the liquid is poured through the screens into containers.

Each of Nelson Pat. No. 3,630,444 and Parkinson Pat. No. 3,730,439 disclose stacked, downwardly semispherical or concaval screens. Holden Pat. No. 2,643,104 and Nelson Pat. No. 4,730,786 disclose upwardly semispherical or concaval disc screens and/or cone screens.

McDonald application, Ser. No. 797,176, assigned to the assignee of the instant invention, discloses stacked wave-shaped or dimpled, perforated plates, wherein separate spacers are not required.

DISCLOSURE OF THE INVENTION

A general object of the invention is to provide an improved discharge nozzle for a fluid machine, especially an improved spring type nozzle arrangement for a liquid filler assembly.

Another object of the invention is to provide an improved nozzle arrangement at the discharge end of a filler nozzle for preventing the liquid from flowing out of the nozzle body under gravity by the surface tension of the liquid or by complete coil to coil closure, and adaptable to being easily and efficiently cleaned in place and sanitized.

A further object of the invention is to provide a plurality of variously shaped tension springs serving as filler nozzles, and mounted in the discharge end of a nozzle body to serve the above mentioned function.

These and other objects and advantages will become more apparent when reference is made to the following drawings and the accompanying description.

BRIEF DESCRIPTION OF THE DRAWINGS

FIGS. 5–7 are perspective views of alternate embodiments;

FIG. 8, 10, 12A, 12B, 12C, 13, and 14 are cross-sectional views of still seven more alternate embodiments.

BEST MODE OF CARRYING OUT THE INVENTION

Figure 1A:
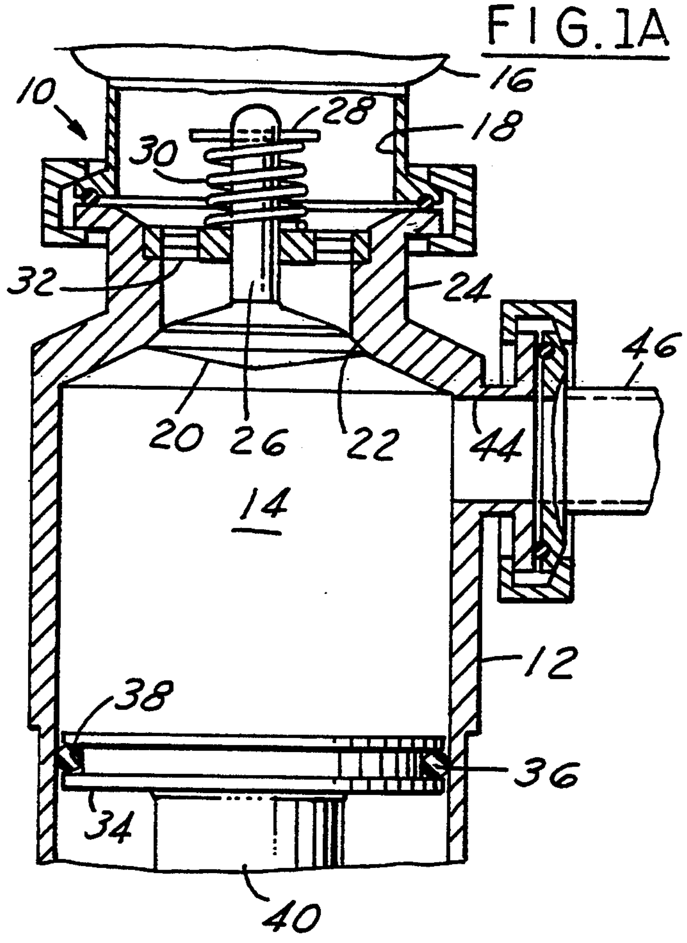
FIGS. 1A and 1B are cross-sectional views of a filler mechanism embodying the invention.
Figure 1B:
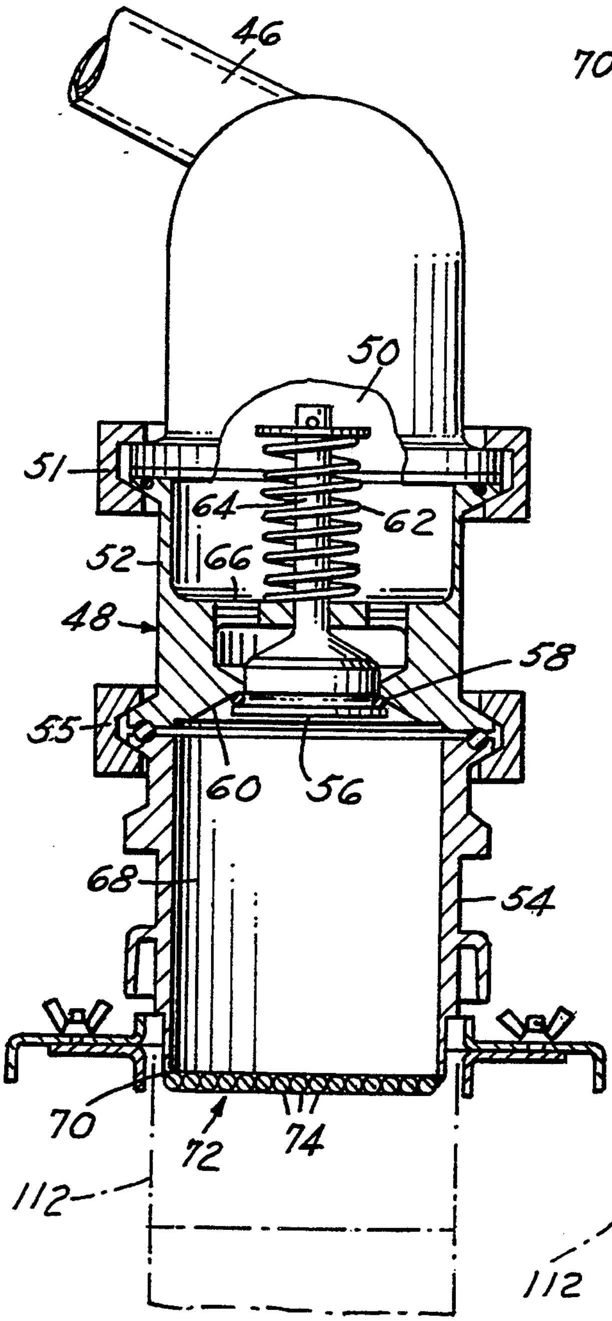

Referring now to the drawings in greater detail, FIGS. 1A and 1B illustrate a filler apparatus 10 including a filler body 12 having a chamber 14 therein for receiving a predetermined volume of liquid from an overhead tank, represented as 16, via a vertical passageway 18. A first check valve 20 cooperates with a seat 22 formed in a neck 24 at the upper end of the chamber 14. A valve stem 26 extends upwardly from the valve 20 through the neck 24 to be connected at the upper end 28 thereof to a spring 30 mounted at the lower end thereof on a fixed perforated member 32, so as to urge the valve 20 upwardly against the seat 22.

A piston 34 having an O-ring 36 mounted in a groove 38 formed around the periphery thereof, is slidably mounted in the chamber 14. A downwardly extending shaft 40 from the piston 34 is adapted to being connected to cylinder means (not shown). An outlet opening 44 is formed in the body 12, leading into a downwardly sloping elbow 46 to a nozzle body 48. A chamber portion 50 at the lower end of the elbow 46 is secured by suitable fasteners, represented as 51, to the nozzle body 48.

The nozzle body 48 includes a valve seat section 52 and a housing 54 secured together by suitable fasteners, represented as 55. A second check valve 56 having an O-ring 58 mounted thereon is cooperative with a seat 60 formed in the body 48 at the base of the valve seat section 52. A spring 62 is connected to a stem 64 extending upwardly from the valve 56. The spring 62 is mounted at its lower end thereof on a fixed perforated member 66 so as to urge the valve 56 and O-ring 58 upwardly against the seat 60.

The housing 54 includes a lower chamber 68 below the valve 56, terminating at a discharge end 70.

Figure 2:
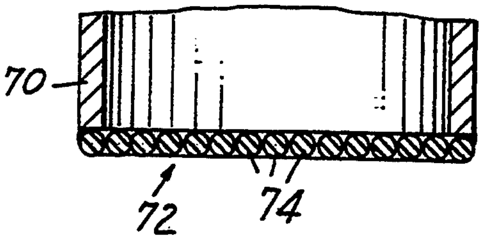
FIG. 2 is an enlarged fragmentary cross-sectional view of the inventive portion of the FIG. 1 structure.

Referring now to FIG. 2, there is illustrated a flat coil spring 72, shown in its normal closed condition. In this condition, the spring 72 may be wound such that adjacent coils 74 are either slightly touching, so as to not wedge together, or spaced apart with a slight clearance therebetween such that the surface tension of the liquid serves to retain the liquid product in the chamber 68 without dripping through the slight clearance. This arrangement is suggested for use with the, so-called, "bottom-up" type filling process, i.e., when either the container is lowered or the nozzle housing is lifted to fill the container during the relative withdrawal motion between the container and the nozzle housing.

Figure 3:
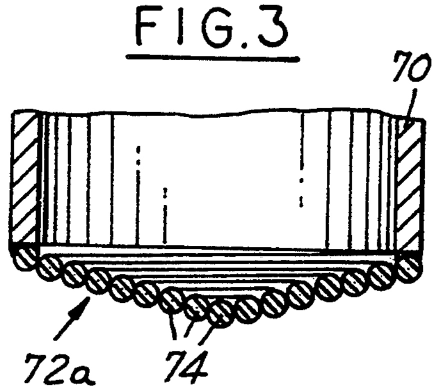
FIG. 3 is an enlarged fragmentary cross-sectional view of an alternate embodiment to the FIG. 2 apparatus.
Figure 4:
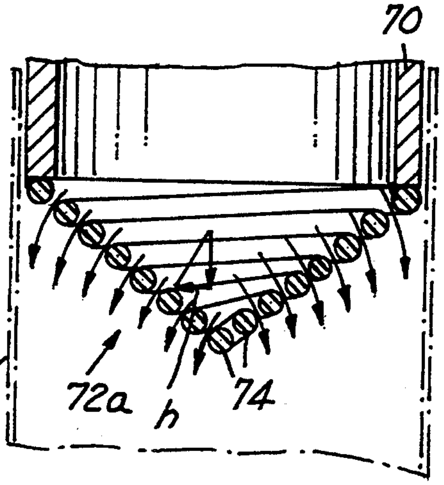
FIG. 4 is a cross-sectional view illustrating the FIG. 3 structure in an operational mode.

FIG. 3 illustrates a spring nozzle wherein the spring 72*a* is upwardly open, conical in shape in its normal closed condition, with adjacent coils thereof touching. FIG. 4 shows the spring 72*a* in its extended position under the force of the fluid thereabove, as will be explained. This arrangement is considered to be more suitable for a "top-down" type filling process, i.e., no relative movement between the container and the nozzle housing 54. The reason for this is that the horizontal velocity component, represented as h in FIG. 4, serves to reduce the vertical downward velocity of the liquid out of the nozzle, to produce more of a divergent flow characteristic represented by the arrows in FIG. 4. This reduces splash at the bottom of the container by virtue of some flow occurring down the walls of the container, thereby diminishing foam buildup.

FIG. 5 is a perspective view of a spring **72*b* similar to the FIG. 3 spring 72*a*. FIG. 6 is a perspective view of an alternate pyramidal-shaped spring 72*c*** embodiment, which fits the typical four-sided container opening and thus tends to minimize the vertical exit velocities of the liquid.

FIG. 7 is a perspective view of a spring **72*d* variation of the FIG. 6 embodiment, wherein two oppositely disposed sides 76 of the spring 72*d*** are formed to be converged inwardly to assume a shape substantially comparable to a paperboard carton top opening wherein typical gable-type side panels are pre-broken along converging score lines, prior to the filling step. After filling the carton, the panels are more readily fully closed and sealed.

Figure 8:
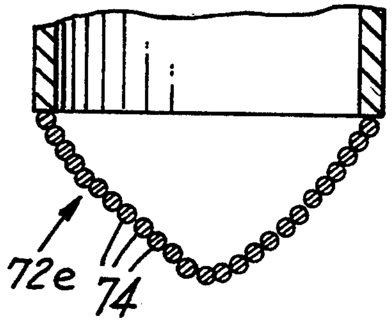
Figure 9:
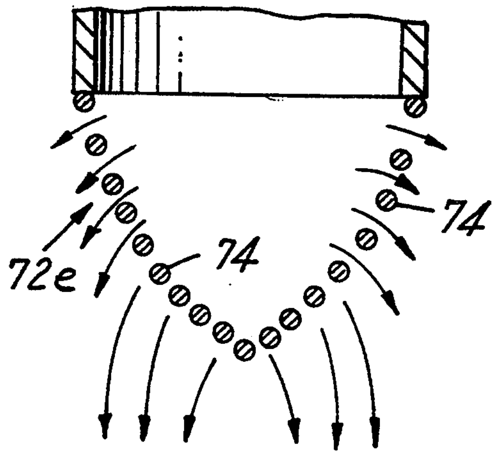

FIG. 8 illustrates a further alternate spring **72*e* embodiment similar to FIG. 3, but formed in a substantially parabolic shape. As such, under the force of fluid thereabove, the coils 74 spread further apart at the upper outer portion than at the lower central portion, as indicated in FIG. 9**. As a result, the fluid forced therethrough attains somewhat of a divergent flow characteristic, suitable for top-down filling applications.

Progressively wound springs, i.e., springs in which the spring varies in rating along its length, allow selection of various characteristics.

Figure 10:
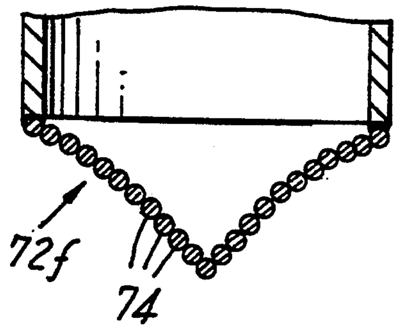
Figure 11:
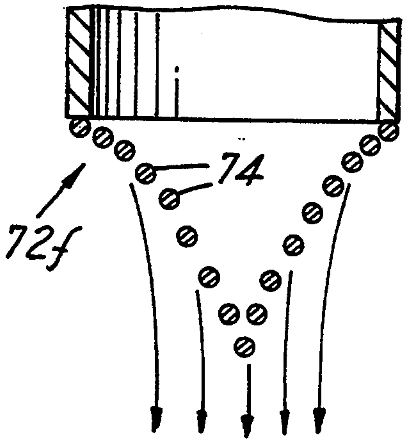
FIGS. 9 and 11 are cross-sectional views illustrating the respective FIGS. 8 and 10 structures in operational modes.

FIG. 10 illustrates a still further alternate spring **72*f* embodiment, wherein the coils 74 are formed with an inward arcuate cross-sectional contour relative to the conical shape of the FIGS. 3 and 5 embodiments. As such, under the force of fluid thereabove, the coils 74 spread further apart at the lower central portion than at the upper outer portion, as indicated in FIG. 11**. As a result, the fluid forced therethrough attains substantially a vertical flow characteristic, suitable for bottom-up filling applications.

FIGS. 12A, 12B and 12C illustrate that coils **74*a* of a spring 72*g*, 72*h* and 72*i*, respectively, may be formed with a four-sided cross-sectional shape, rather than a round or oval cross-sectional shape. Such four-sided coil shapes are adaptable to any of the springs 72, 72*a*, 72*b*, 72*c* and 72*d*. The four-sided cross-sectional shape is preferably oblong rectangular. As such, the coils 74*a* are annularly stepped in a generally conical configuration with the long sides (1) positioned horizontally (FIG. 12A); or (2) positioned diagonally (FIG. 12B); or (3) positioned vertically (FIG. 12C**).

Referring now to FIG. 13, a valve seat 78 is formed in the lower chamber 68. A valve 80 is secured to an end of a valve stem 82 for seating cooperation with the valve seat 78. The other end of the valve stem 82 is secured to the center of the spring **72*a*, for example, which urges the valve 80 into seating engagement with the valve seat 78. In this arrangement, since the liquid from the chamber 68 must first unseat the valve 80 from the seat 78 and then flow radially outwardly and then downwardly therepast, as the clearance between the valve 80 and the seat 78 progressively increases, lower filling velocities are experienced and initial spurting or spraying through the coils 74 is avoided. If desired, the coils may fully close, with the valve 80 retained just short of closing against the seat 78**.

Figure 14:
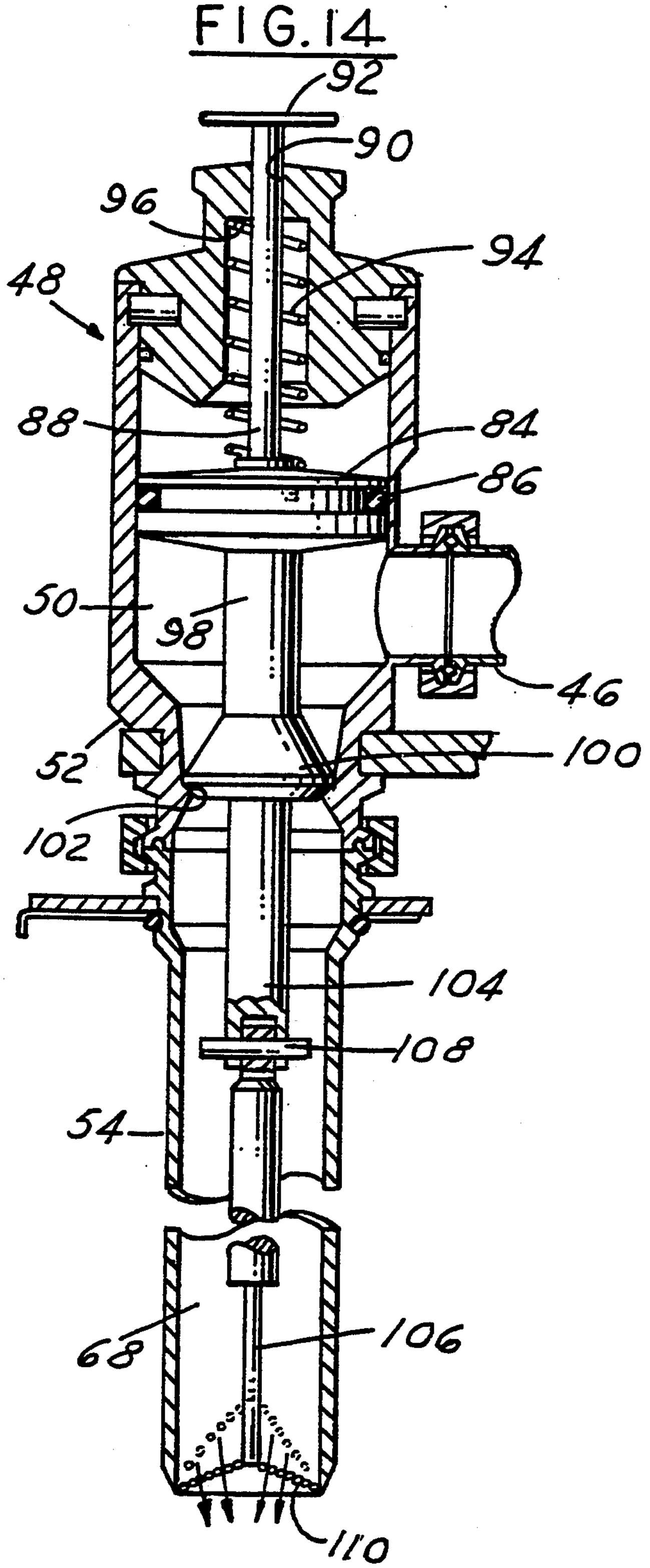

Referring now to FIG. 14, in this arrangement, a piston 84, having an o-ring 86 mounted around the outer periphery thereof, is slidably mounted in the chamber 50. A rod 88 extends upwardly through an opening 90, with a handle 92 formed on the outer end thereof. A coil spring 94 is compressed between the piston 84 and a seat 96 at the upper surface of the chamber 50.

A valve stem 98 extends downwardly from the piston 84 to a check valve 100. The valve 100 is urged downwardly onto a valve seat 102 by the coil spring 94. A first extension stem 104 extends downwardly from the valve 100 in the chamber 68. A second extension stem 106 is connected by a dowel pin 108 to the first extension stem 104, and extends to a spring 110 at the exit end of the housing 54. The spring 110 is wound in an inverted cone shape and closed in its inoperative state, i.e., when the valve 100 is on the seat 102.

In this arrangement, flow through the spring 110 when the valve 100 is lifted from the seat 102, is in a converging configuration, more suitable for a bottom-up filling application.

If there are inter-coil spaces for each of the above described spring embodiments in its liquid-retaining condition, the areas of the individual spaces and the total area thereof, relative to the overall coil area, are such as to produce the result that surface tension of the liquid above the spring coils will prevent the liquid from flowing through the spaces under the force of gravity.

The overall operation of the filler assembly 10 is conventional, i.e., the filler assembly is first primed such that the chamber 14 and the nozzle body 48 chambers 50 and 68 are filled with a selected liquid product. The assembly is then ready for the production run. When cycled, the piston 34 moves upwardly, forcing a predetermined, measured volume of liquid from the chamber 14 through the outlet opening 44 and the sloping elbow 46 and, thence, into the valve seat section 52, lowering the check valve 56 (FIG. 1B), or raising the check valve 100 (FIG. 14). This, in turn, forces the equivalent volume of fluid from the lower chamber 68 through the spaces between spring wires, into a selected size carton represented as 112 in FIG. 1B, positioned therebelow by the usual indexing conveyor and/or lifting mechanism (not shown). Conventional external means may be employed to raise and lower the carton 112 relative to the nozzle housing 54 for bottom-up filling applications.

Once the pumping stroke is completed, the spring 62 (FIG. 1B) urges the valve 56 and O-ring 58 upwardly into contact with the seat 60, with the chamber 68 remaining full. In the FIG. 14 embodiment, once the pumping stroke is completed, the spring 94 urges the valve 100 downwardly, but short of engaging the seat 102, so that the spring nozzle 110 is assured of fully closing. Retraction of the piston 34 (FIG. 1A) downwardly in the chamber 14 pulls the valve 20 away from the seat 22 to once again fill the chamber 14 with the selected volume of fluid, whereupon the spring 30 urges the valve 20 into contact with the seat 22, ready for the next cycle.

At this point, the spring coils serve to retain the liquid in the nozzle chamber 68 either by sealingly touching each other or by virtue of the surface tension of the liquid adjacent the coils.

For those springs whose spring coils sealingly touch each other, such a spring may serve as a spring-form check valve in a fluid line upstream of a discharge end or nozzle.

The liquid-retaining springs may be of stainless steel, rubber, plastics, or glass.

The rates of the liquid-retaining springs are preferably low, as is any pre-set tension therein, to avoid high-velocity exit streams during filling.

The liquid-retaining springs have the advantages that they are less liable to be clogged by such things as product flakes and butter-fat than are conventional screens, and that good diffusion, laminar flow and shut-off characteristics are obtainable with them.

INDUSTRIAL APPLICABILITY

It should be apparent that the invention provides an improved nozzle arrangement for a filler assembly, which efficiently retains liquid, and generally need not be disassembled and autoclaved in order to be thoroughly cleaned.

It should be further apparent that the spring nozzle shapes may be varied to be adaptable to either bottom-up or top-down carton filling applications, and that the coils thereof may be formed of various cross-sectional shapes.

While several embodiments of the invention have been shown and described, other modifications are possible within the scope of the following claims.

What is claimed is:

1. A nozzle for use at a chamber of a machine for filling cartons with a liquid, said nozzle comprising a coil spring operatively connected to said chamber and including a plurality of coils adapted to retain a volume of liquid in said chamber until such liquid under pressure operates to urge the coils apart to provide clearances between the coils sufficient for the flow therethrough of said liquid to minimize high velocity streams of said liquid flowing between the coils and to develop laminar-like flow characteristic in a selected one of divergent and convergent patterns suitable for both bottom-up and top-down carton filling applications, wherein the adjacent coils of said spring in their liquid-retaining conditions are positioned so as to provide predetermined spaces therebetween, and wherein the respective and overall areas of the spaces are such that surface tension o the liquid in said chamber will prevent the liquids from passing therethrough under the force of gravity.

2. The nozzle described in claim 1, wherein said spring is connected at its outer periphery to said chamber.

3. The nozzle described in claim 1, wherein said spring is flat.

4. The nozzle described in claim 1, wherein the spring is dished in shape.

5. The nozzle described in claim 4, wherein the shape of said spring is conical.

6. The nozzle described in claim 4, wherein the shape of said spring is pyramidal.

7. The nozzle described in claim 4, wherein said spring is formed with two parallel sides and two oppositely disposed inwardly converging sides.

8. The nozzle described in claim 4, wherein said spring is parabolic in axial section.

9. The nozzle described in claim 4, wherein said spring is cusp-shaped in axial section.

10. The nozzle described in claim 4, wherein said spring is open in an upstream direction.

11. The nozzle described in claim 4, wherein said spring is open in a downstream direction.

12. The nozzle described in claim 1, wherein said coils are round in cross-section.

13. The nozzle described in claim 1, wherein said coils are four-sided in cross-section.

14. The nozzle described in claim 13, wherein said coils are oblong rectangular in cross-section.

15. The nozzle described in claim 14, wherein said rectangular coils are formed in an annularly stepped configuration.

16. The nozzle described in claim 15, wherein the long sides of the cross-sections of the coils are positioned horizontally.

17. The nozzle described in claim 15, wherein the long sides of the cross-sections of the coils are positioned diagonally.

18. The nozzle described in claim 15, wherein the long sides of the cross sections of the coils are positioned vertically.

19. A nozzle for use at a chamber of a machine for filling cartons with a liquid, said nozzle comprising a coil spring operatively connected to said chamber and including a plurality of coils adapted to retain a volume of liquid in said chamber until such liquid under pressure operates to urge the coils apart to provide clearances between coils sufficient for the flow therethrough of said liquid to minimize high velocity streams of said liquid flowing between the coils and to develop laminar-like flow characteristic in a selected one of divergent and convergent patterns suitable for both bottom-up and top-down carton filling applications, and a valve seat formed in said chamber, a valve stem secured at one end thereof to the center of said spring, and a valve formed on the other end of said stem for seating cooperation with said valve seat.

20. The nozzle described in claim 19, wherein the adjacent coils of said spring abut against each other.

21. The nozzle described in claim 19, wherein said spring is secured to the rim of an outlet mouth of said chamber, and said valve seat is formed a predetermined distance upstream of said outlet mouth.

22. The nozzle described in claim 21, wherein said spring is dished in shape, open in an upstream direction, and urges said valve against said valve seat and wherein said liquid under pressure presses said valve towards said spring.

23. The nozzle described in claim 21, wherein said spring is dished in shape and open in a downstream direction, and wherein such liquid under pressure presses said valve away from said spring.

24. The nozzle described in claim 19, wherein the adjacent coils of said spring in their fluid-retaining conditions are positioned so as to provide predetermined spaces therebetween, and wherein the respective and overall areas of the spaces are such that surface tension of the fluid in said chamber will prevent the fluid from passing therethrough under the force of gravity.

* * * * *